（12）United States Patent
Pighin et al.

(10) Patent No.: US 8,035,643 B2
(45) Date of Patent: Oct. 11, 2011

(54) ANIMATION RETARGETING

(75) Inventors: Frederic P. Pighin, San Francisco, CA (US); Cary Phillips, Moss Beach, CA (US); Steve Sullivan, San Francisco, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 829 days.

(21) Appl. No.: 11/688,066

(22) Filed: Mar. 19, 2007

(65) Prior Publication Data

US 2008/0231640 A1   Sep. 25, 2008

(51) Int. Cl.
*G06T 13/00* (2011.01)

(52) U.S. Cl. ........ 345/473; 345/474; 345/475; 345/427; 345/619; 382/107; 382/209; 700/83; 704/266

(58) Field of Classification Search .................. 345/427, 345/473, 619, 474, 475; 703/26; 704/266; 382/107, 209
See application file for complete search history.

(56) References Cited

U.S. PATENT DOCUMENTS

| | | | | |
|---|---|---|---|---|
| 6,061,072 | A * | 5/2000 | Rouet et al. ............ | 345/473 |
| 6,130,679 | A | 10/2000 | Chen et al. | |
| 6,606,095 | B1 * | 8/2003 | Lengyel et al. ............ | 345/473 |
| 6,888,549 | B2 * | 5/2005 | Bregler et al. ............ | 345/474 |
| 6,919,892 | B1 * | 7/2005 | Cheiky et al. ............ | 345/473 |
| 7,006,881 | B1 * | 2/2006 | Hoffberg et al. ............ | 700/83 |
| 7,027,054 | B1 * | 4/2006 | Cheiky et al. ............ | 345/473 |
| 7,129,949 | B2 * | 10/2006 | Marschner et al. ............ | 345/473 |
| 7,590,264 | B2 * | 9/2009 | Mattes et al. ............ | 382/107 |
| 2005/0057569 | A1 | 3/2005 | Berger | |
| 2005/0062743 | A1 | 3/2005 | Marschner et al. | |
| 2006/0009978 | A1 * | 1/2006 | Ma et al. ............ | 704/266 |
| 2006/0087510 | A1 | 4/2006 | Adamo-Villani et al. | |
| 2009/0141986 | A1 * | 6/2009 | Boncyk et al. ............ | 382/209 |

OTHER PUBLICATIONS

Summer et al. "Deformation Transfer for Triangle Meshes", SIGGRAPH 2004.*
Pyun et al. "An Example-Based Approach for Facial Expression Cloning", Eurographics/SIGGRAPH 2003.*
Pei et al. "Transferring of Speech MOvements from Video to 3D Face Space", IEEE, Jan. 2007.*
Anguelov et al. "SCAPE: Shape Completion and Animation of People", ACM 2006.*
Chai et al. "Vision-based Control of 3D Facial Animation". SIGGRAPH 2003.*
Noh et al. "Expression Cloning"; ACM 2001.*
"Flex Your Facial Muscles" by Jeff Landers, downloaded from http://www.gamasutra.com/features/20000414/lander_01.htm on Sep. 4, 2004, 7 pages.
"Deformation Transfer for Triangle Meshes" by R. Sumner et al., for Computer Science and Artificial Intelligence Laboratory Massachusetts Institute of Technology, copyright 2004, pp. 399-405.

(Continued)

*Primary Examiner* — Kimbinh T Nguyen
(74) *Attorney, Agent, or Firm* — Fish & Richardson P.C.

(57) ABSTRACT

Systems and methods are described, which create a mapping from a space of a source object (e.g., source facial expressions) to a space of a target object (e.g., target facial expressions). In certain implementations, the mapping is learned based a training set composed of corresponding shapes (e.g. facial expressions) in each space. The user can create the training set by selecting expressions from, for example, captured source performance data, and by sculpting corresponding target expressions. Additional target shapes (e.g., target facial expressions) can be interpolated and extrapolated from the shapes in the training set to generate corresponding shapes for potential source shapes (e.g., facial expressions).

42 Claims, 10 Drawing Sheets

OTHER PUBLICATIONS

"Facial Motion Retargeting" by Pighin et al., for Siggraph 2006 course notes Performance-driven Facial Animation, dated 2006, 9 pages.

"Analysis of co-articulation regions for performance-driven facial animation" by Fidaleo et al., for Computer Animation and Virtual Worlds, *Comp. Anim. Virtual Worlds 2004*; 15: 15-26 (*DOI: 10.1002.cav.4*) 12 pages.

"Construction and Animation of Anatomically Based Human Hand Models" by Albrecht et al., Eurographics/SIGGRAPH *Symposium on Computer Animation 2003*, pp. 98-109 and pp. 368.

\* cited by examiner

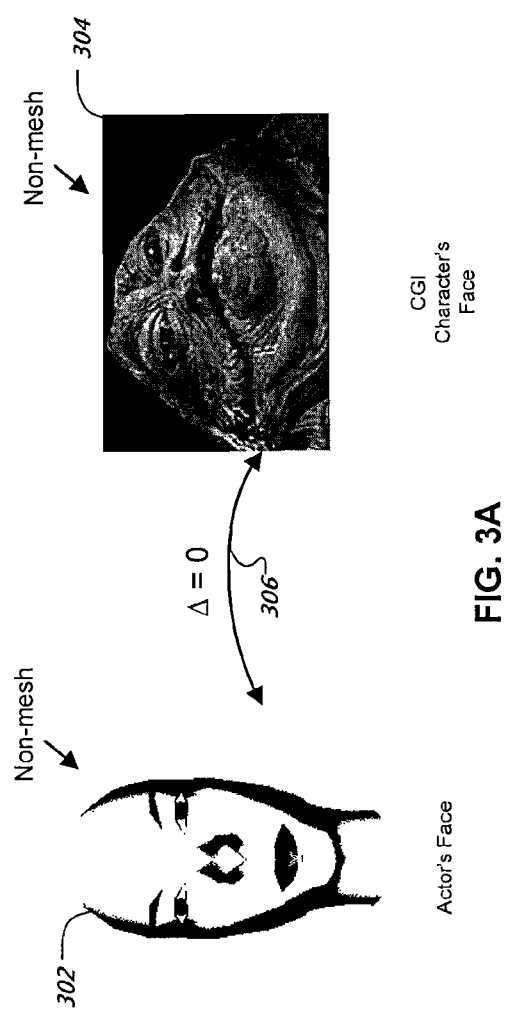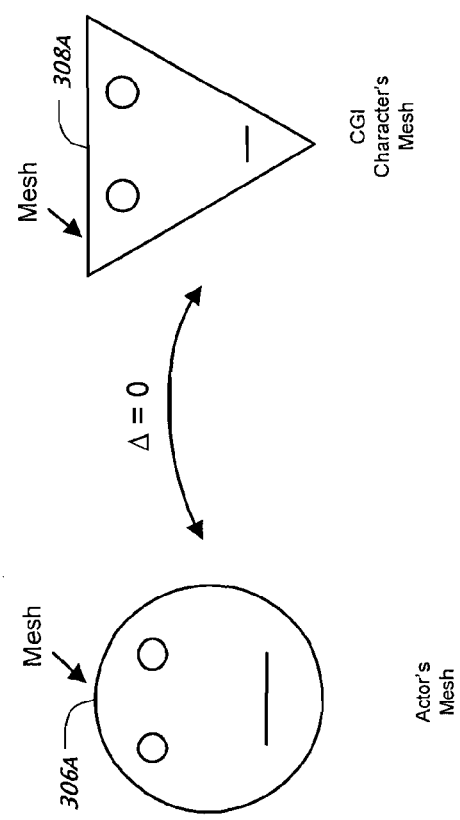
FIG. 3A
FIG. 3B

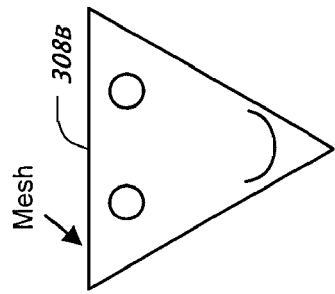
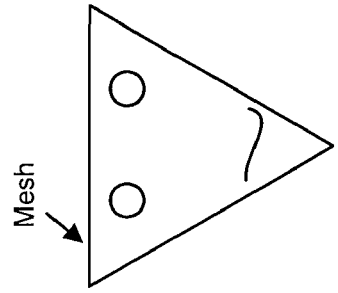
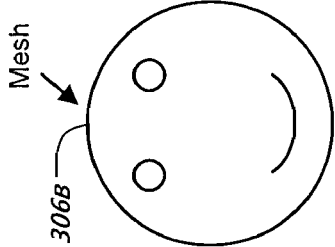
FIG. 3C
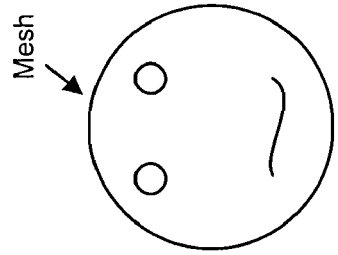
FIG. 3D

| Source 402 | Mapping Function 406 | Target 404 |
|---|---|---|
| $\delta_S(V_{S0},t)$ <br> $\delta_S(V_{S1},t)$ ⎬ 408 <br> . <br> . <br> $\delta_S(V_{S0},t)$ <br> $\delta_S(V_{S1},t)$ <br> . <br> . | Retarget[$\delta_S(MTS(V_{S0},t))$] <br> Retarget[$\delta_S(MTS(V_{S1},t))$] ⎬ 416 <br> . <br> . <br> Retarget[$\delta_S(MTS(V_{S0},t))$] <br> Retarget[$\delta_S(MTS(V_{S1},t))$] <br> . <br> . | $\delta_T(V_{T0},t)$ <br> $\delta_T(V_{T1},t)$ ⎬ 414 <br> . <br> . <br> $\delta_T(V_{T0},t)$ <br> $\delta_T(V_{T1},t)$ <br> . <br> . |

400 ⤴

Sad $\Delta_S$ 410

Happy $\Delta_S$ 412

FIG. 4

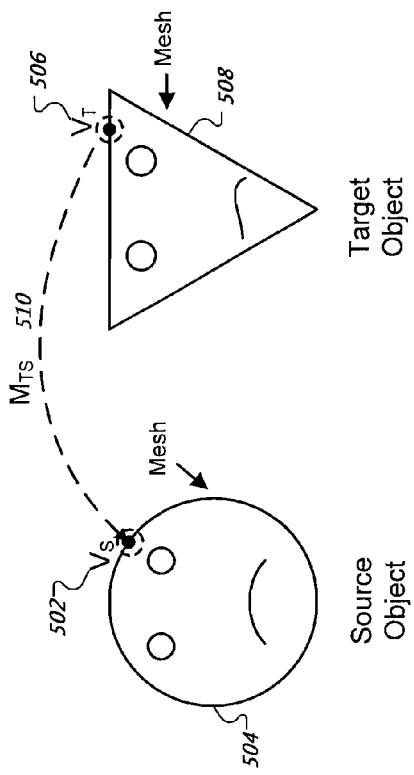

FIG. 5

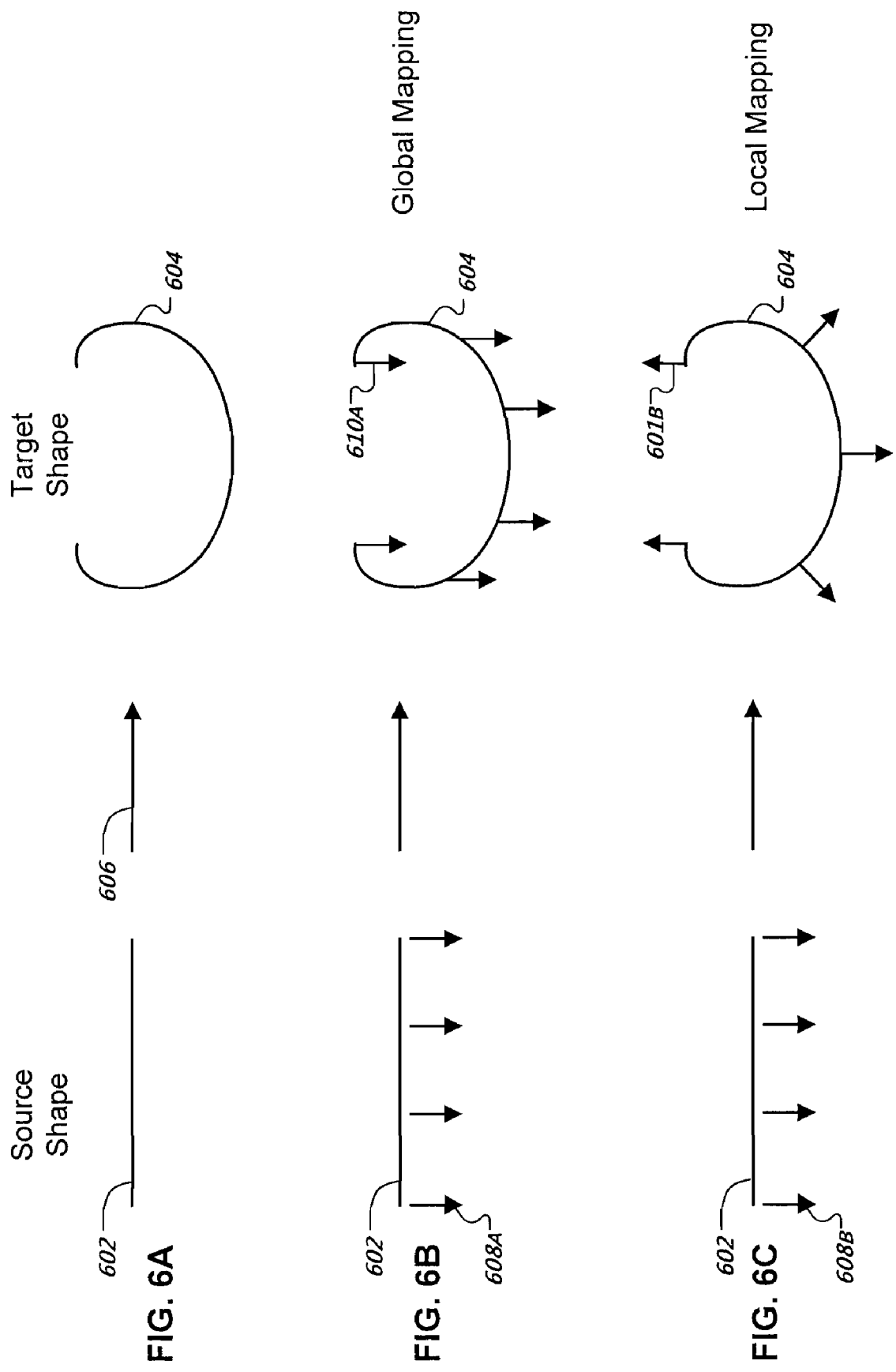

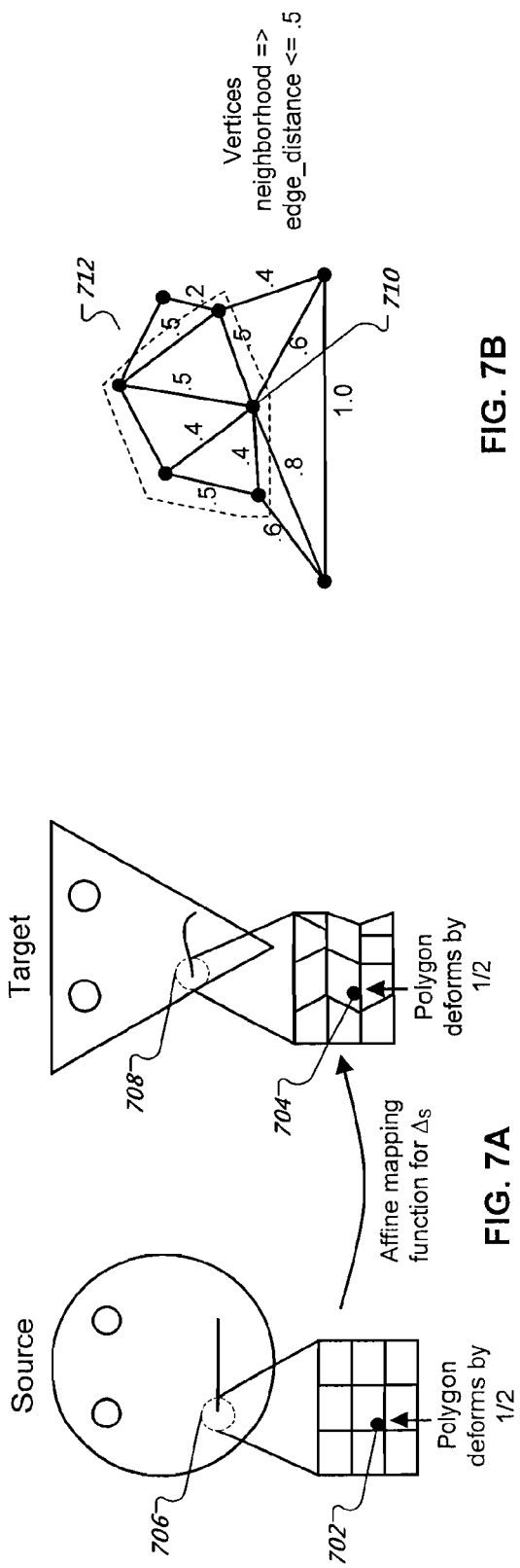
FIG. 7A
FIG. 7B
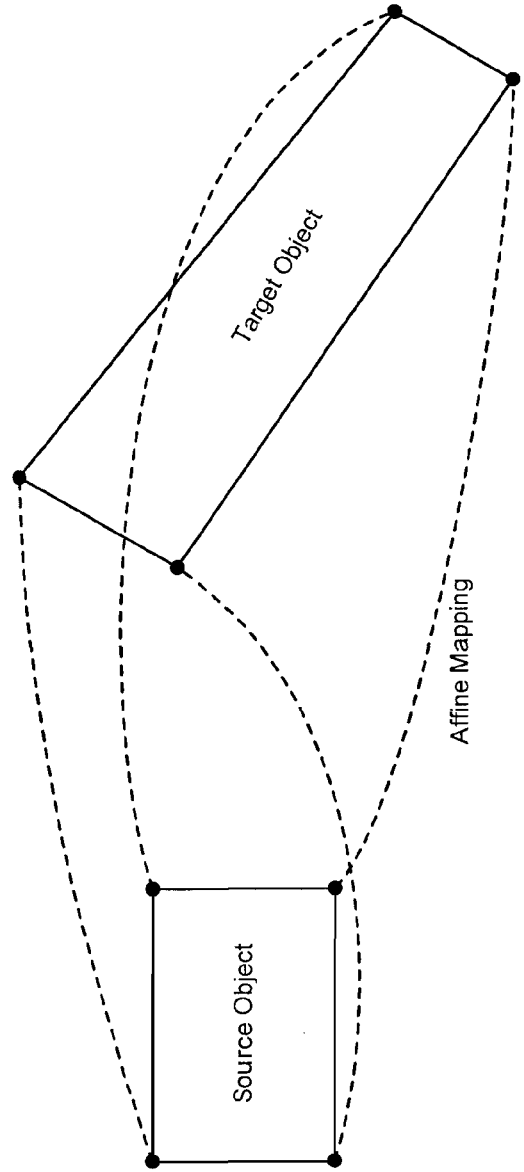
FIG. 7C

ANIMATION RETARGETING

TECHNICAL FIELD

Implementations are described, which relate to relate to computer animation, and, more particularly, to animation retargeting.

BACKGROUND

Motion capture technology can be used to record an object's movement, such as an actor's facial motion. The recorded performance can then be used to animate a computer-generated character's face. If the character's face differs from the actor's face, the actor's facial motions can be adapted or retargeted to the proportions and personality of the character's face.

SUMMARY

In general, systems and methods for animating a target object based on a source object are described.

In a first general aspect, systems and methods are described, which create a mapping of a transform from a space of a source object (e.g., source facial expressions) to a space of a target object (e.g., target facial expressions). In certain implementations, the mapping is learned based a training set composed of corresponding shapes (e.g. facial expressions) in each space. The user can create the training set by selecting expressions from, for example, captured source performance data, and by sculpting corresponding target expressions. Additional target shapes (e.g., target facial expressions) can be interpolated and extrapolated from the shapes in the training set to generate corresponding shapes for potential source shapes (e.g., facial expressions).

In a second general aspect, a method animation mapping is described. The method includes mapping a transform of a source shape to a target shape. The mapping is based on a training set of previous associations between the source and target shapes. The method also includes applying the mapped transform to the target shape for output of an initial mapping to a user, and modifying the training set to generate a refined mapping of the transform applied to the target shape.

In another general aspect, a method is described, which includes outputting an initial mapping of a transform from a source shape to a target shape and iteratively receiving feedback from a user and adjusting the mapping of the transform based on the feedback.

In yet another general aspect, a computer-implemented method for mapping a transform from a source shape to a target object is described. The method includes associating first and second positions of a source object with corresponding first and second positions of a target object. The positions are at least partially defined by a mesh comprising vertices. The method also includes generating, based on the associations, a mapping between a third position of the source object and a third position of the target object. The mapping comprises an affine transformation based on a transform of selected vertices of the source object relative to local vertices within a predetermined distance from vertices selected for transformation.

In another general aspect, a method of generating animation is described. The method includes generating a mapping between a source mesh and a target mesh based on previous mappings. Generating the mapping includes applying an affine transformation to transforms of one or more vertices of the source mesh, wherein the transforms are relative to a neighborhood of vertices a predetermined distance from the one or more vertices being transformed.

In another general aspect, a method of generating animation is described. The method includes selecting a point on a target object to reflect a transform of a corresponding point on a source object, identifying a first neighborhood of geometric shapes that are a predetermined distance from the point on the target object and associating the first neighborhood with a corresponding second neighborhood of geometric shapes on the source object, and determining an affine mapping for a transform of the point on the target object relative to the first neighborhood based on a transform of the corresponding point on the source object relative to the second neighborhood.

In another general aspect, a system is described. The system includes a mapping function generator for mapping a transform of a source shape to a target shape. The mapping is based on a training set of previous associations between the source and target shapes. The system also includes an interface for receiving modifications, based on user input received in response to an output of the mapping, to the training set for generating a refined mapping of the transform applied to the target shape.

The systems and techniques described here may provide one or more of the following advantages. First, a system can provide an accurate method to map a transform from a source object to a target object. Second, a system can increase retargeting accuracy by mapping a transform based on a local neighborhood around a point of interest, where the neighborhood is defined by an edge distance from the point of interest. Third, a system can provide a user interface for visualizing a result of a mapped transform. Fourth, a system provides a user interface for controlling and incrementally creating mapping between source and target objects. Fifth, a system increase the ability to map complex motion by working directly in the space of data associated with a source object.

Implementations of the systems and methods are set forth in the accompanying drawings and the description below. Other features and advantages of the described systems and methods will be apparent from the description and drawings, and from the claims.

DESCRIPTION OF DRAWINGS

FIGS. 3A-D are examples of corresponding source and target objects mapped with the system of FIG. 1.

FIG. 4 is an example table that stores data used for mapping movement from a source to a target object.

FIG. 5 is an example of corresponding vertices from the source and target objects mapped with a system of FIG. 1.

FIGS. 6A-C are examples of mapped movement vectors.

FIGS. 7A-C are examples illustrating local affine mapping of movement between the source and target objects.

DETAILED DESCRIPTION

Animating a digital character can be a costly and tedious task. In certain implementations, reusing motions produced for a source character to animate a target character can save a significant amount of time and effort.

Illustrious systems and techniques are described that map, or retarget, movement from a source object, such as motion capture data associated with an actor's face, to a target object, such as computer-generated character's face. If the computer-generated character's face differs from the actor's face, the movement of the actor's face can be adapted or retargeted to the proportions and personality of the character's face.

For example, an actor may smile; however, this movement may be difficult to translate directly to the character because the character's mouth could be, for example, twice as large as the actor's mouth. The system permits the actor's mouth be mapped to the larger character's mouth in a way that when the actor smiles the character performs a corresponding smile.

Certain implementations described below can create a mapping from a space of the source object (e.g. a source's facial expressions) to a space of the target object (e.g., a target's facial expressions).

In certain implementations, dynamic mappings can be learned based on a training set that includes corresponding positions for the source and target objects, such as corresponding facial expressions, in each space. A user can create the training set by selecting positions, or expressions, from a motion captured source performance (e.g., an actor's performance) and explicitly sculpting corresponding target expressions. The systems and methods described can interpolate/extrapolate the corresponding expressions for source expressions that are not present in the training set.

The system can provide a user interface (UI) that allows a user, such as an animation artist, to specify factors that influence how the source object is mapped to the target object. In some implementations, a user can immediately visualize the movement applied to the target object, and the user can modify one or more factors to refine the mapping. The systems and methods are described in more detail below.

Figure 1:
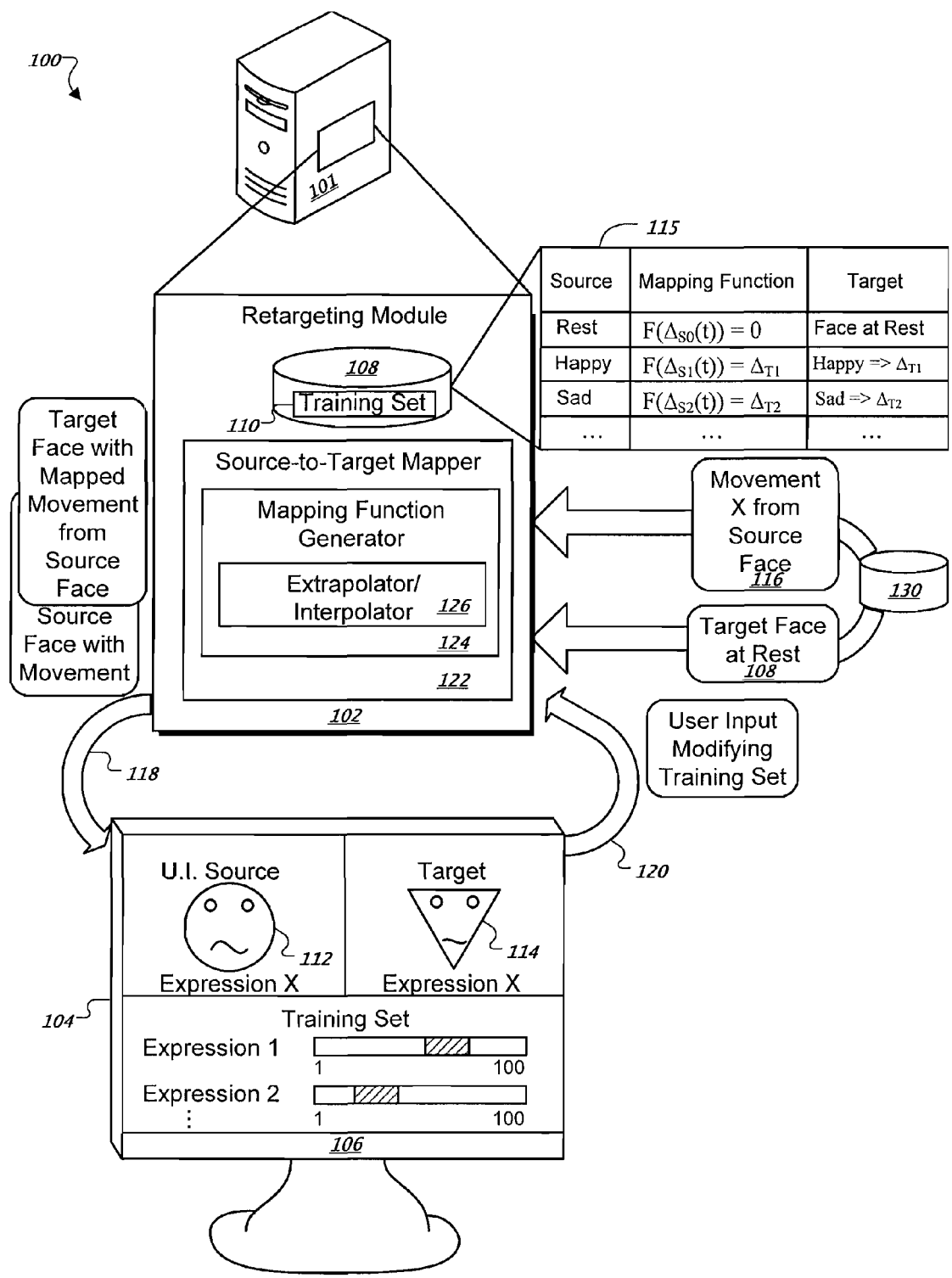
FIG. 1 is an example schematic diagram of a system for mapping movement from a source object to a target object.

FIG. 1 is an example schematic diagram of a system 100 for mapping movement from a source object 112 to a target object 114. The system 100 includes a computing device 101 having a retargeting module 102 and a display 104 for presenting a user interface (UI) 106.

The retargeting module 102 includes a first database 108 that stores a training set 110 of mappings between the source and target objects. The retargeting module 102 can use the training set 110 to derive new mappings of movements between the source and target objects. In some implementations, the training set 110 can be stored in a data structure, such as a table 115, that include sets of corresponding object positions, such as facial expressions, for the source and target objects.

The retargeting module 102 can receive information 116 specifying a movement of the source object relative to a baseline position of the source object and information 18 specifying a baseline position of the target object. For the purposes of illustration, the baseline position used in the description will be a neutral, or at-rest, position. The retargeting module 102 can map a movement corresponding to the movement for the source object to the at-rest position of the target object.

For example, the information 116 can specify a change in movement, or a movement delta, from a source at-rest expression, such as an actor's face at rest, to a second expression, such as an actor smiling. The retargeting module 110 can transform, or retarget, the movement delta for application to the at-rest position of the target object (e.g., a character's face in a rest position). When the targeting module 110 transforms and applies the delta movement to the at-rest expression of the character, the character appears to smile because the delta movement includes information specifying movement from the at-rest position to a smiling expression.

In certain implementations, information used to describe the geometry and movement of the source object can be captured using motion capture cameras (not shown) that film an object, such as an actor. In some implementations, the information captured by the motion capture cameras can be displayed using a three-dimensional mesh that specifies the position of the object using the vertices linked by edges.

In certain implementations, the source object 112 and the corresponding target object 114 can be displayed on the UI 106 (as indicated by arrow 118) by a display device 104, such as a monitor. The displayed source object 112 may have a first expression, and the displayed target object 114 may have a corresponding first expression. A user can influence the mapping of the source movement delta to the target object by inputting values that affect the training set used to derive mapping functions between the source and target objects, which is indicated by arrow 120.

After the receiving the user input, the retargeting module 102 can remap the source movement delta to the target object, and display the refined mapping to the user. The user may iteratively adjust the mapping of the movement based on the displayed mapping until the user is satisfied with the displayed mapping.

The retargeting module 102 can include a source-to-target mapper 122, which performs the mapping between the source and target objects. The source-to-target mapper 122, in turn, may include a mapping function generator 124 that uses mapping samples in the training set 108 to derive additional mappings for previously unmapped expressions.

In certain implementations, the mapping function generator 124 can include an extrapolator/interpolator 216 that extrapolate or interpolates the mapping samples stored in the training set 108 to derive the additional mappings for previously unmapped expressions.

Additionally, information, such as the training set, the source delta movement, and the mapping functions can be stored in the database 108. In other implementations, the information may be stored in separate databases, which can be external to the computing device 101. For ease of illustration, FIG. 1 shows information 116 specifying the source delta movement and information 128 specifying the at-rest position of the target object stored in a separate database 130, but this example is not intended to limit where the various information is stored within the system 100.

Figure 2:
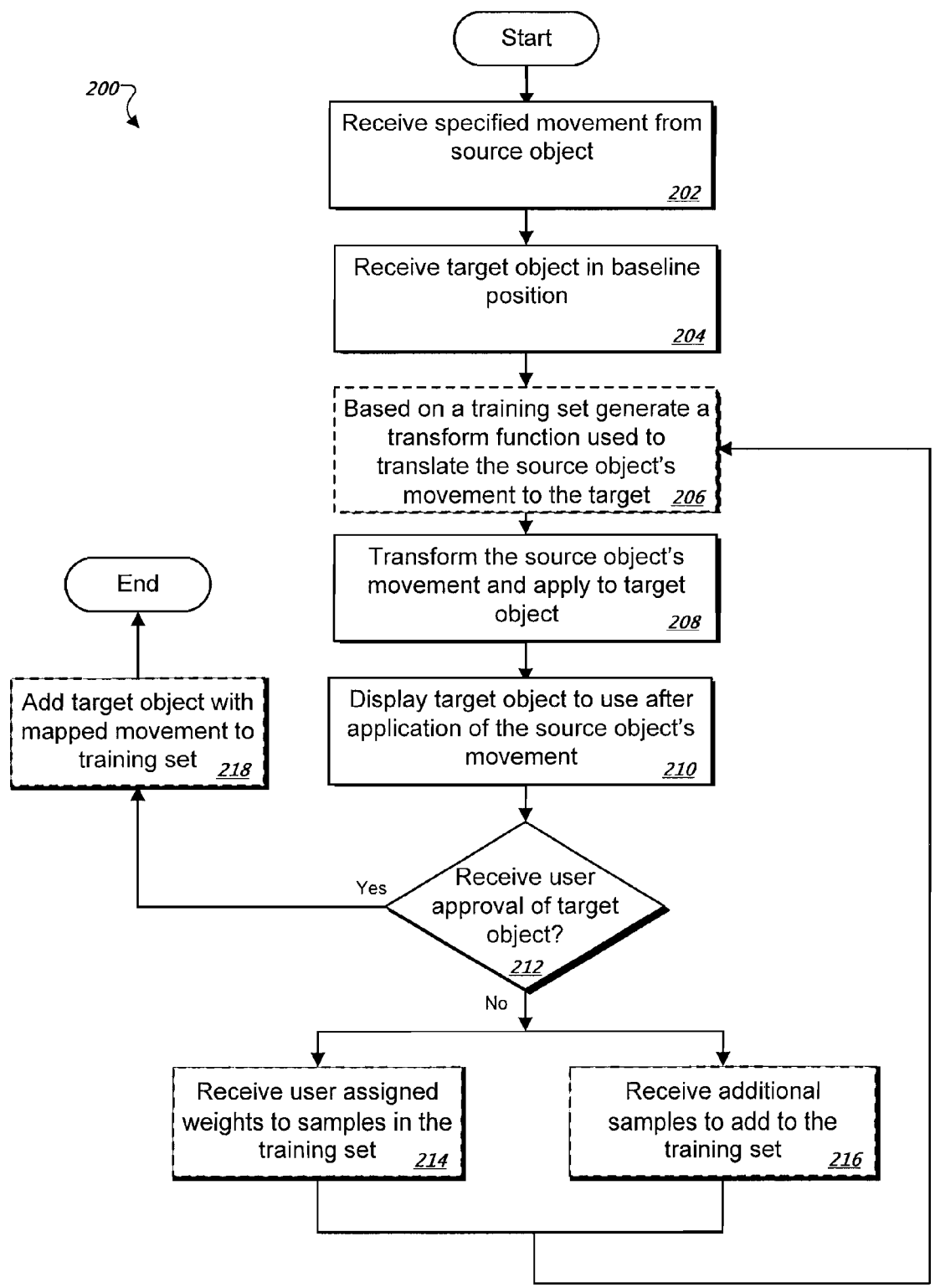
FIG. 2 is a flowchart of an example method for mapping movement from the source object to the target object.

FIG. 2 is a flowchart of an example method 200 for mapping movement from the source object 112 to the target object 114. For example, if the source object is a face that smiles, the smiling movement is mapped to the target object.

At step 202, information specifying a movement of a source object is received. For example, the movement may be specified by a set of vectors that describe one or multiple movements of an actor's face. In some implementations, the vectors specify the movement of a portion of the source object from an at-rest position to a first expression (e.g., happy, sad, angry, etc.). At step 204, information specifying the target object in an at-rest position is received.

At step 206, a transformation function is generated based on the training set. In certain implementations, the transform function is an affine transformation that is derived by interpolating or extrapolating previous affine transformations used to map movements from the source object to the target object. For example, the training set can include affine mappings between the source and target objects. These mappings may be used to interpolate or extrapolate a new mapping between the source and target object.

At step 208, the source object's movement can be applied to the target object. Vectors specifying the source object's movement can be modified for application on the target object if the target and source objects differ in geometry. For example, an affine transformation generated at step 206 can modify the source object's movement vectors. The transformed movement vectors can then be applied to the target object.

For example, the retargeting module 102 can apply the transformed movement vectors to the target object with a neutral expression. The transform movement vectors specify how the target object should move relative to the neutral expression.

At step 210, the target object is displayed to a user. The retargeting module 102 can output the target object with the source movement applied so that a user can visually inspect the mapping performed by the retargeting module. The retargeting module 102 may also display the source object with the corresponding movement applied so that the user can compare the expression of the source object with the expression of the target object.

At step 212, a determination is made whether the user approves of the mapping performed on the target object. In some applications, the automatic mapping performed by the retargeting module 102 may be manually refined. For example, the target object may have a particular way of smiling where the left side of the mouth curls a downward. When the retargeting module 102 maps a movement of the source target smiling, movement which causes both sides of the mouth to curve upward may be applied to the target object. A user may desire to refine the mapping so that left side of the target objects mouth curls downward. If the user does not approve of the mapping applied to the target object the method 200 can move to optional steps 214 and 216.

At optional step 214, weights may be assigned to samples in the training set in order to refine the mapping of the movement from the source object to the target object. For example, one of the mapped expressions in the training set may be an expression in which the target and source objects are smirking with the left side of the mouth curling downward. The user may assign a weight to this expression so that the sample contributes more heavily to the mapping then other samples.

In some implementations, the user may specify the weight for an expression through the user interface 106 by adjusting a slider bar associated with the expression, as shown in FIG. 1. In other implementations, the user may enter a percentage of contribution a particular sample should contribute. For example, a user may specify that a happy expression should contribute 30 percent and an angry expression should contribute 70 percent.

At optional step 216, additional samples can be added to the training set. For example, the user may explicitly map the source objects smiling movement to a smiling movement for the target object where the mouth is curl downward on the left side.

After the user has refined the influence and/or samples of the training set, the retargeting module 102 may generate the transform function using the modified training set, as shown in the step 206.

If the user approves of the mapping applied to the target object, optional step 218 can be performed. At the step 218, the target object with the mapped movement can be added to the training set. After this step, the method 200 can end.

In some implementations, the steps 206-214 are optional. Instead, the user explicitly sculpts corresponding positions for the target object based on the source object. These mappings can then be added to the training set and used to derive additional mappings for the training set, or for dynamically generated mappings, which is discussed more in association with FIGS. 9 and 10.

FIGS. 3A-D are examples of corresponding source and target objects mapped with the system 100 of FIG. 1. FIG. 3A shows motion capture data of an actor's face 302 with a neutral, or at rest, expression. Also shown, is a computer-generated character's face 304 with a corresponding neutral, or at-rest expression. The expressions are mapped to each other as indicated by arrow 306.

In some implementations, the value that is mapped from the actor face 302 to the characters face 304 is a delta, or change, in movement between an at-rest expression and a second expression. In FIG. 3A the delta is zero because the expression being mapped is the at-rest expression, and consequently, there is no movement to map.

FIG. 3B shows mesh representations of the source and target objects shown in FIG. 3A. A user can manually map the source and target positions, for example, by associating vertices in actor's mesh 306A with corresponding vertices in the character's mesh 308A. For instance, the user can associate a vertex at the corner of the mouth of the actor's mesh 306A with one or more vertices at the corner of the mouth of the character's mesh 308A.

In other implementations, the user may associate other features of the source and target meshes, such as source and target polygons formed by vertices and connecting edges of the source and target meshes, respectively.

FIG. 3C shows mesh representations of the source and target objects in a smiling position, or expression. In certain implementations, the smiling actor's mesh 306B is expressed as the at-rest mesh actor 306A shown in FIG. 3B plus a $\Delta s_1$ which expresses a displacement of the actor's mesh relative to the at-rest actor's mesh 306A, as indicated by 310. The retargeting module 102 can the map $\Delta s_1$ to the target object to generate the smiling character mesh 308B.

For example, the position of the vertices of the smiling actor's mesh relative to the actor's at-rest mesh (i.e., the displacement or $\Delta s_1$) can be associated with the position of the smiling character's mesh relative to the character's at-rest mesh. In some implementations, a user, such as an animation artist, may link portions of the meshes together so that a smiling expression for the source object is associated with a smiling expression for the target object.

FIG. 3D shows an association between a worried expression on the source object and a worried expression on the target object. The movement used to generate the worried expression for the source object may be expressed as $\Delta s_2$, which is mapped to the target object in a substantially similar method as described for FIG. 3C.

FIG. 4 is an example table 400 that stores data used for mapping movement from the source object to the target object. For example, the table 400 may be one way to implement the table 115 of FIG. 1. The table 400 includes a source column 402, a target column 404, and a mapping function column 406.

The source column includes rows of values, each of which specify a displacement of a vertex (or other mesh component) relative to an at-rest position of that vertex. For example, $\delta_s(V_{S0}, t)$ 408 specifies the displacement $\delta$ of an individual vertex $V_{S0}$ on the source mesh with respect to time (t).

The composite displacement of a plurality of vertices on the source can form an expression for the source object, such as the expression "Sad $\Delta s$" 410, where the $\Delta s$ signifies the composite displacement of the vertices from a neutral expression. Similarly, other expressions, such as "Happy $\Delta s$" 412 can include specified displacements for vertices within the source mesh.

The target column 404 includes values specifying displacement of vertices in the target mesh. For illustrative purposes displacements for vertices in the source mesh and corresponding displacements for vertices in the target mesh are shown in the same row. For example, the source vertex displacement 408 can specify the movement of a vertex at the corner of a right eye on the actor's mesh. The corresponding target vertex displacement 414 specifies the movement of a corresponding vertex (or vertices) at the corner of a right eye on the character's mesh.

Information illustrated in the table 400 can be used to compute a function $\Delta_T$ that maps vertices on the target mesh onto displacements of the source mesh at a given time (t).

The mapping function column 406 includes functions that describe how target vertices are mapped to corresponding locations on a source.

More specifically, as shown in the table 400, $V_{Ti}$, such as $V_{T1}$ 414, is an arbitrary vertex on the target mesh, and MTS, such as $MT_1S_1$ 416, is a function that maps target vertices onto a corresponding location on the source mesh. As such, MTS ($V_{Ti}$) is the location on the source mesh that corresponds to the target vertex $V_{Ti}$.

Furthermore, in the table 400, $\Delta_S$ is a function that maps source locations onto an animation, or displacement, at a given time (t). Hence, $\delta_s(MTS(V_{Ti}), t)$ is the source displacement that corresponds to the target vertex $V_{Ti}$. "Retarget" is a function that maps source displacements onto target displacements.

In summary:

$$\delta_T(V_{Ti},t)=\text{Retarget }[\delta_S(MTS(V_{Ti}),t)]$$

Note that the function:

$$\delta_T(V_{Ti},t)=\delta_S(MTS(V_{Ti}),t)$$

would produce displacements for the target vertices by re-sampling the displacements on the source mesh. Whereas, $$\text{Retarget }[\delta_S(MTS(V_{Ti}),t)]$$

adapts the source displacements to the target vertices.

The mapping of the movement for individual vertices is described more in association with FIG. 5.

FIG. 5 is an example of corresponding vertices from the source and target objects mapped with a system of FIG. 1. As shown in the example, a vertex $V_T$ 506 on a target object 508 is associated with a vertex $V_s$ 502 on the source object 504. This association is described by $M_{TS}$, which specifies which target vertex (or set of vertices) is associated with which source vertex (or set of vertices).

FIGS. 6A-C are examples of mapped movement vectors. FIG. 6A shows a source shape 602, such as a line used to define an actor's mouth. FIG. 6B also shows a corresponding target shape 604, which may represent a computer-generated character's mouth in an expression that corresponds (as indicated by the arrow 606) with the expression of the actor's mouth. For example, the source shape 602 may be the actor's mouth in an at-rest, or neutral, position. Similarly, the target shape 604 may be the character's mouth in a corresponding resting position.

FIG. 6B shows a downward displacement of the source shape 602, where a source displacement is indicated by the arrows 608A. If the movement is mapped relative to global features of the source object, for example, the movement is mapped as a downward movement relative to the entire actor's face, then a target displacement is also mapped as a downward movement because the movement is downward relative to the entire character's face (as indicated by the arrows 610A).

However, FIG. 6C shows mapping a displacement based on local features. For example, the source displacements 608B may be measured relative to a local neighborhood (e.g., surrounding vertices or polygons). Measured from this local neighborhood, the displacement may be expressed as an outward movement from the neutral position of the local features instead of a downward displacement relative to the actor's face.

When this localized outward displacement is mapped to the target shape 604, the corresponding target displacement is outward from the neutral position of a corresponding local neighborhood of the target shape 604 (as shown by the arrow 610B) instead of downward relative to the character's face.

FIGS. 7A-C are examples illustrating local affine mapping of movement between the source and target objects. FIG. 7A shows an affine mapping between a source point 702 and a target point 704 (both of which may be vertices on a mesh or points in-between vertices on the mesh).

A neighborhood 706 around the source point 702 may include polygons formed by vertices connected by edges. The target object of FIG. 7A has a corresponding neighborhood 708 around the target point 704. The source neighborhood 706 and the target neighborhood 708, however, are not required to have the same geometry (e.g., the shape and number of polygons within the neighborhoods may differ).

In certain implementations of local affine mapping, if the source neighborhood 706 deforms (e.g., by half), the target neighborhood 704 deforms by the same percentage (e.g., by half).

FIG. 7B illustrates how the neighborhood around a selected point is defined according to one implementation. The illustrative neighborhood is defined based on edge distance from a vertex. If the point of interest is a vertex 710, then vertices within a 0.5 edge distance are included in the neighborhood of the vertex 710 as indicated by a dashed line 712.

Movement of the vertex 710 is then measured relative to the other vertices within the neighborhood 712. In other implementations, movement of a point of interest is measured relative to polygons, or other geometric shapes, defined by the vertices and edges that are within the neighborhood 712.

FIG. 7C illustrates an affine mapping between a source and target object that have the same topology (e.g., number of vertices and edges), but different geometry (e.g., a positioning of the vertices and edges). In some implementations, this permits meshes that appear significantly different to be mapped to each other. As illustrated, polygons mapped between the source and target objects may be positioned, sized, and shaped differently.

In alternative implementations, the mapping may include a rigid mapping transformation and scaling. For example, the target mesh can include polygons that are the same shape as polygons in the source mesh, except that the target polygons are rotated and scaled (e.g., sized larger or smaller while maintaining the polygons' proportions).

Figure 8:
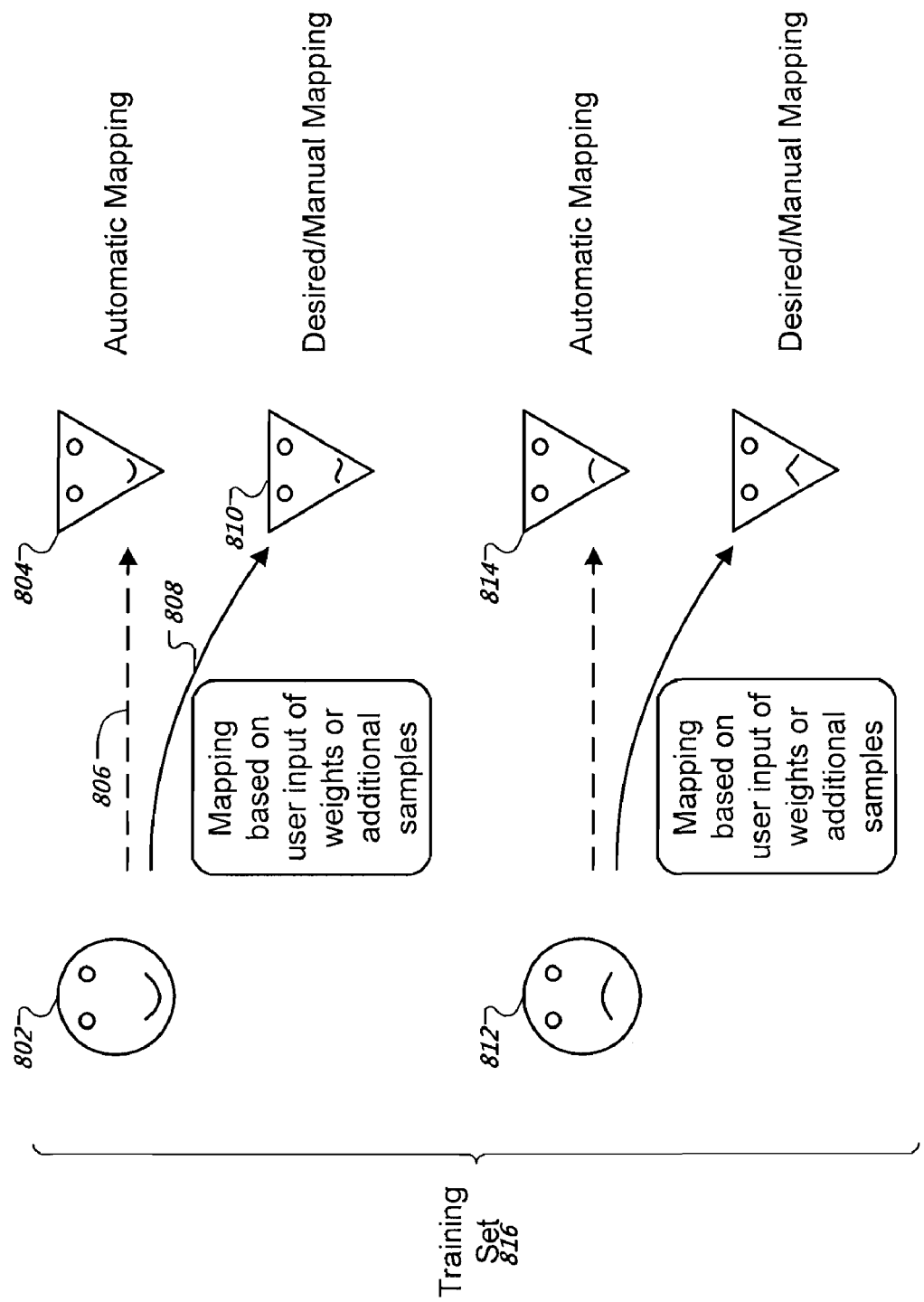
FIG. 8 is an example of manually refining mapped movement between the source and target objects.

FIG. 8 is an example of manually refining mapped movement between the source and target objects. As discussed in association with the steps 212 through 216 of FIG. 2, automatic mapping between the source and target objects can be manually refined. The retargeting module 102 can map a source object with a smiling expression 802 to a target object with a corresponding smiling expression 804 as indicated by the dashed arrow 806. This mapping may then be displayed to a user. However, the target object may have a characteristic smile that deviates from the smiling expression 804.

In some implementations, the user can enter input to adjust weights that influence the contribution of samples in a training set of previous mappings used to generate the mapping 806. For example, the user may specify importance functions that weight the contributions of the samples in the training set.

The retargeting module 102 can then remap the smiling expression of the source object using a function derived from the modified training set as indicated by arrow 808. The refined smiling expression of the target object 810 can then be displayed to the user, who can accept the refined expression or modified the training set to further refine the mapping.

This process may be repeated for several expressions, such as the sad expression 812 of the source object which is mapped to a corresponding sad expression 814 of the target object.

The manually refined expression mapping can be added to the training set 816, which is used to derive additional mappings between the source and target objects.

Figure 9:
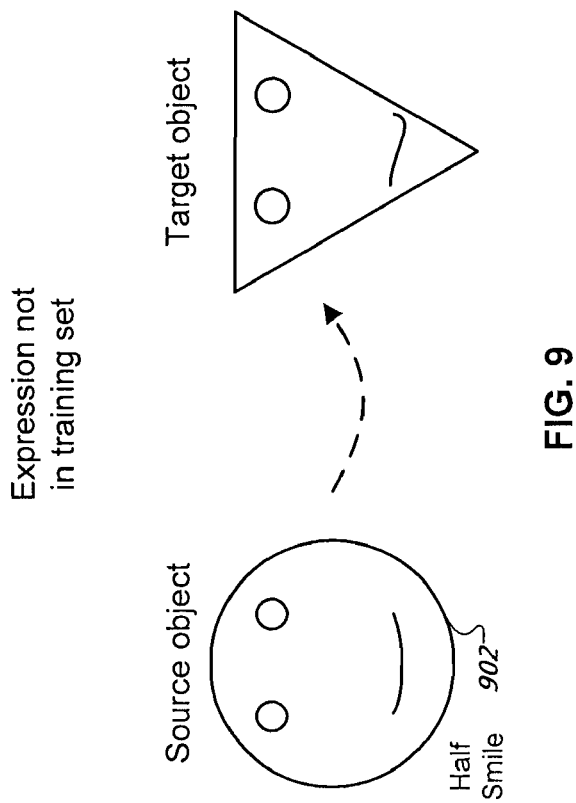
FIG. 9 is an example of dynamically mapping previously unmapped movements between the source and target objects.

FIG. 9 is an example of dynamically mapping previously unmapped movements between the source and target objects. In some implementations, the FIGs. and associated text that are described above are used to generate sample mappings for a training set, and the training set is used to dynamically generate new mappings of movement from the source object to the target object.

It may be impractical to require user intervention in mapping all possible expressions or positions that are captured for a source object. Building a finite set of sample mappings that are then used to dynamically create new mappings between the source and target objects can permit the system to animate the target object regardless of whether a matching mapping is stored in the training set.

For example, the retargeting module 102 can create twenty sample mappings between an actor's face and a computer-generated character's face. Each of the sample mappings may be refined so that the character's face maintains the desired characteristic expression or personality (e.g., the character's smile may curl at one side, whereas the actor's smile may curl at both sides).

The retargeting module 102 can then access motion capture information for the source object that has not been mapped, for example, the half smile expression 902. Using the previous mappings in the training set, the retargeting module 102 can derive a mapping between the source object in the target object.

When the mapping of the movement of the source object is applied to the target object, the mapped movement reflects the previous mappings in the training set. For example, if the training set includes a mapping where the target object has a smiling expression with one side of a character's face curling upwards more than the other side, the newly generated mapping can reflect this feature if the target object's expression is based on the smiling expression (e.g., the target object's expression is a half-smile.)

In some implementations, the derivation of the dynamic mapping described in association with FIG. 8 includes an extrapolation or interpolation of the previous mappings of the training set.

Figure 10:
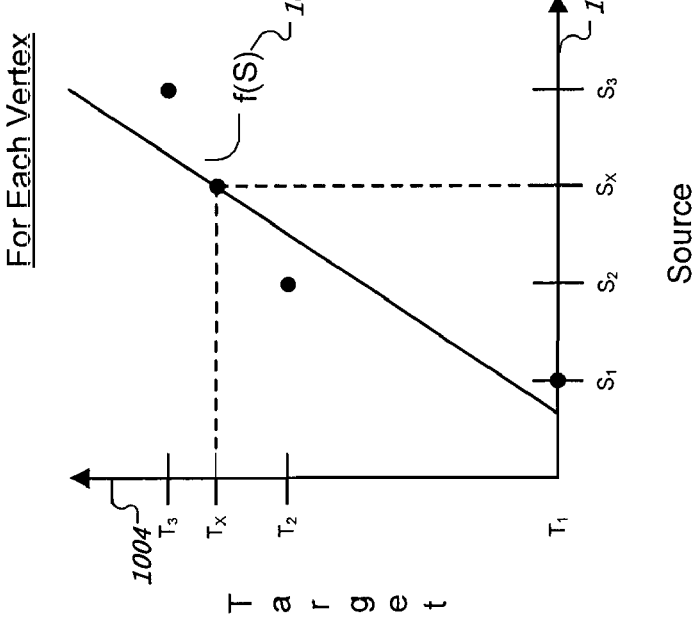
FIG. 10 is an example graph illustrating an interpolation of previous mappings to generate new mappings between the source and target objects.

FIG. 10 is an example graph 1000 illustrating an interpolation of previous mappings to generate new mappings between the source and target objects. The graph 1000 includes a source axis 1002 used to quantify values associated with movements of a vertex on the source object. For example, one value is $S_1$, which corresponds to the vertex's position in an at-rest expression.

At $S_2$ the vertex has an increased value because it is associated with a different expression, such as a smirking expression, which requires a movement of the vertex from the position in the neutral expression. This movement, or delta, from the at-rest expression is quantified as $S_2$ in the graph 1000. Similarly, $S_3$ represents an additional value quantifying a movement of the vertex associated with another expression, such as a worried expression.

In the graph 1000, the values $S_1$-$S_3$ represent a vertex's position for previously mapped source object expressions stored in the training set.

The target axis 1004 and the values $T_1$-$T_3$ similarly represent a vertex's position, but the position is for previously mapped target object expressions.

Each value $S_1$-$S_3$ is mapped to a corresponding value $T_1$-$T_3$ that represents a corresponding vertex on the target object. For example, the value $S_1$ for an at-rest expression of the source object is mapped to $T_1$, which is a corresponding position of a vertex on the target object for the at-rest expression.

The mapped values for the movement of the vertex can be used to derive a function f(S) 1006, where $T_x$=f($S_x$). Using the function 1006, the retargeting module 102 can interpolate a value for $T_x$ based on a corresponding $S_x$. Similarly, if the given $S_x$ is not between two samples of the training set, the corresponding $T_x$ can be estimated by extrapolation.

For illustrative purposes, the example of FIG. 10 is a simplified interpolation in one-dimension, and is not intended to limit the number of dimensions used in the interpolation or extrapolation of dynamically derived mappings.

Figure 11:
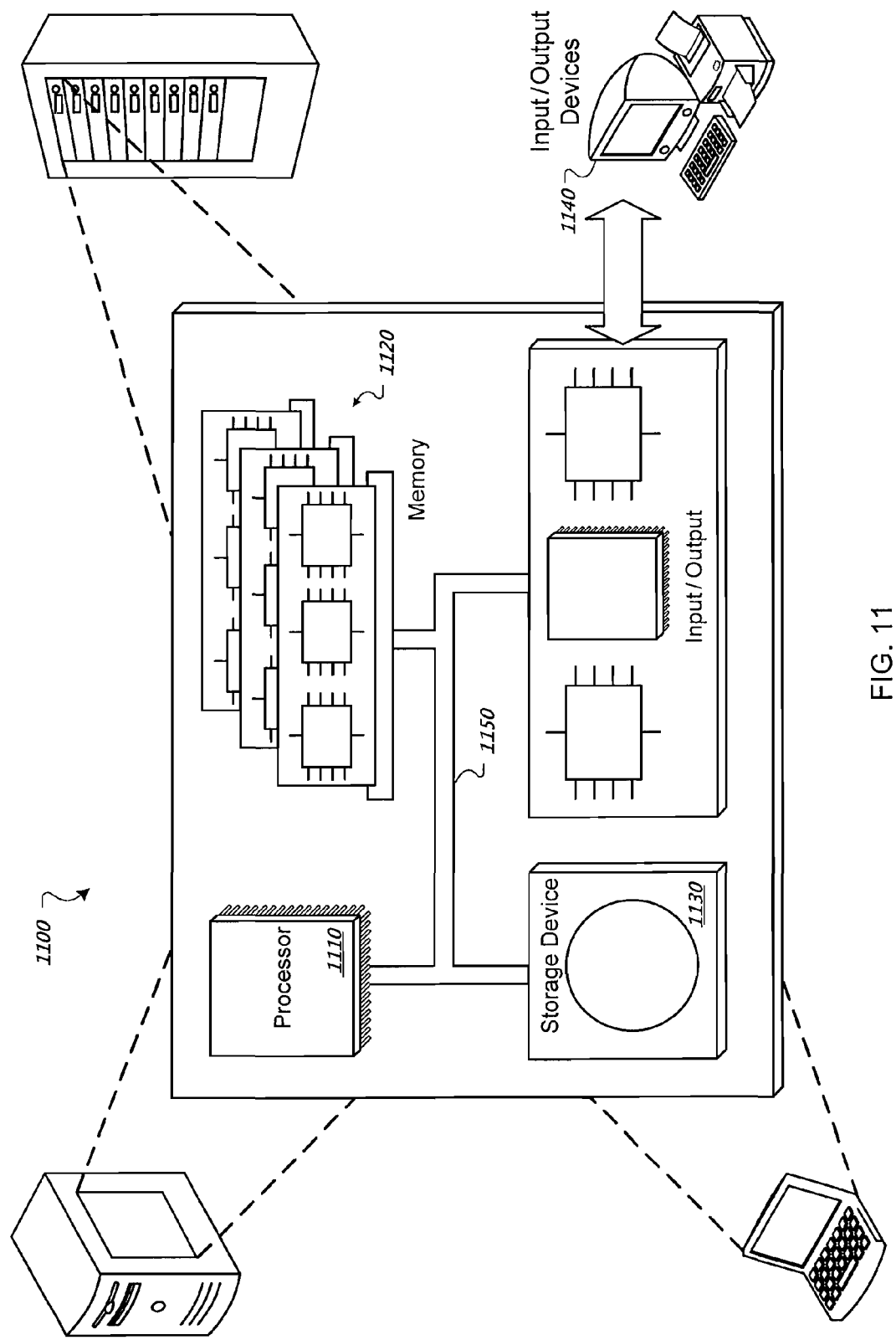
FIG. 11 is an example of a general computer system.

FIG. 11 is a schematic diagram of a computer system 1100. The system 1100 can be used for the operations described in association with any of the computer-implement methods described previously, according to one implementation. The system 1100 includes a processor 1110, a memory 1120, a storage device 1130, and an input/output device 1140. Each of the components 1110, 1120, 1130, and 1140 are interconnected using a system bus 1150. The processor 1110 is capable of processing instructions for execution within the system 1100. In one implementation, the processor 1110 is a single-threaded processor. In another implementation, the processor 1110 is a multi-threaded processor. The processor 1110 is capable of processing instructions stored in the memory 1120 or on the storage device 1130 to display graphical information for a user interface on the input/output device 1140.

The memory 1120 stores information within the system 1100. In one implementation, the memory 1120 is a computer-readable medium. In one implementation, the memory 1120 is a volatile memory unit. In another implementation, the memory 1120 is a non-volatile memory unit.

The storage device 1130 is capable of providing mass storage for the system 1100. In one implementation, the storage device 1130 is a computer-readable medium. In various different implementations, the storage device 1130 may be a floppy disk device, a hard disk device, an optical disk device, or a tape device.

The input/output device 1140 provides input/output operations for the system 1100. In one implementation, the input/output device 1140 includes a keyboard and/or pointing device. In another implementation, the input/output device 1140 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them.

The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, as well as originating from motion capture techniques, the source information can also be procedurally generated, simulated, or "hand-animated" by an artist.

Also, although many of the examples described above are associated with facial retargeting, the systems and methods can be used other contexts, such as modifying animated mesh deformations. For example, the system can permit specifying sparse geometric corrections and interpolating/extrapolating the corrections in animations of arbitrary durations. This method can be used as an alternative to traditional key-framing.

In other implementations, the systems and methods can, of course, be used to retarget features other than facial features. For example, source shapes for joints (e.g., elbows, fingers, knees, etc.) can be retargeted to target shapes for corresponding joints.

In yet other implementations, the systems and methods can be used for retargeting source motion to target motion instead of or in addition to retargeting source shapes to target shapes. For example, a user could specify a timing or parameterization for paths taken by the target vertices based on the paths taken by the source vertices during motion.

In some implementations, retargeting motion from the source object to the target object can improve the target object's performance if significant remapping from source to target occurs. Additionally, retargeting motion may be useful when creating or reducing characteristic motions that are mapped from the source object to the target object because the movement that creates the characteristic motion for the source object can be substantially duplicated for the target object by specifying the paths and timing of movement for the target vertices based on the source vertices.

In other implementations, the described training set is modified based on computer-implemented procedures instead of or in addition to user input. For example, the initial training set that includes shapes based on one actor's performance can be supplemented with shapes based on additional actors' or actresses' performances. Corresponding shapes (e.g., the position of a face during a smiling expression) from two or more performers can be used so that retargeting takes into account both shapes.

For example, the source-to-target mapper 122 can generate a composite smiling expression for the training set based on smiling expressions from multiple performers. This composite smiling expression can then be used for retargeting to the target object. In another example, smiling expressions from the same actor performed at different times can be used to create a refined training set.

In yet other implementations, the above described system can be used while working with multiple base, or rest, poses. For example, the change in position for the source vertices can be expressed relative to more than one source shape.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer implemented method for animation mapping comprising:
creating a mapping, using a computer system, from a first configuration of a source shape to a first configuration of a target shape, wherein the mapping is created using a training set of previous associations of other configurations of the source shape with other configurations of the target shape, respectively, wherein the previous associations were created by user selection of source positions of the other configurations of the source shape for association with target positions of the other configurations of the target shape;
applying, using the computer system, the mapping to the target shape and displaying the first configuration of the target shape;
receiving input in the computer system generated by a user sculpting the first configuration of the target shape into a second configuration; and
modifying the training set, using the computer system and based on the input, the training set modified to generate a refined mapping from the first configuration of the source shape to the second configuration of the target shape.

2. The method of claim 1, wherein the mapping from the first configuration of the source shape comprises a first value expressing a first change in position from the first configuration of the source shape to the first configuration of the target shape.

3. The method of claim 2, wherein the mapping further comprises a second value expressing a second change in position from the first configuration of the source shape to the first configuration of the target shape.

4. The method of claim 2, wherein the display of the first configuration of the target shape comprises the target shape that corresponds to the source shape.

5. The method of claim 1, wherein the mapping from the first configuration of the source shape comprises a timing or parameterization for paths taken by source vertices associated with the source shape.

6. The method of claim 5, wherein the display of the first configuration of the target shape comprises a timing or parameterization for paths taken by target vertices that correspond to the paths take by the source vertices.

7. The method of claim 1, wherein modifying the training set further comprises receiving a modification based on execution of a computer-implemented procedure.

8. The method of claim 7, wherein the computer-implemented procedure comprises generating a composite configuration of the source shape used in the refined mapping.

9. The method of claim 8, wherein the composite configuration of the source shape is based on the source shape and a second configuration of the source shape.

10. The method of claim 1, wherein the mapping comprises applying an affine transformation before transforming the target shape.

11. The method of claim 10, further comprising estimating the affine transformation based on previous affine transformations between the source and target shapes.

12. The method of claim 11, wherein estimating the affine transformation comprises extrapolating or interpolating the previous affine transformations.

13. The method of claim 1, wherein the source and target shapes each comprise a mesh of vertices linked by edges that specifies geometry of the shape.

14. The method of claim 13, wherein the topology of the meshes of the source and target shapes differs.

15. The method of claim 1, wherein modifying the training set further comprises assigning a weighting factor, input by the user, to one or more of the associations in the training set.

16. The method of claim 15, wherein the weighting factor is assigned using an importance function.

17. The method of claim 1, wherein modifying the training set further comprises generating new or deleting previous associations between the source shape and the target shape.

18. The method of claim 1, further comprising iteratively modifying the training set based on user input in response to mappings generated by previous modifications to the training set.

19. The method of claim 1, further comprising generating the previous associations using a sculpting user interface (UI) that links geometry of the source shape to geometry of the target shape.

20. The method of claim 1, wherein the source shape comprises information defining an actor face selected from a group consisting of motion capture data, procedurally generated data, simulated data, and artist created data.

21. The method of claim 1, wherein the target shape comprises a computer-generated character's face.

22. The method of claim 1, wherein creating the mapping from the source shape to the target shape comprises determining transforms for portions of the source shape and applying the transforms to corresponding portions of the target shape.

23. The method of claim 22, wherein the portions comprise vertices in a mesh.

24. The method of claim 23, wherein a transform for each vertex is determined relative to a local neighborhood of vertices a predetermined distance from the vertex.

25. The method of claim 24, wherein the distance is based on edge distance from the vertex.

26. The method of claim 23, wherein a transform for each vertex is determined relative to a local neighborhood of geometric shapes defined by vertices a predetermined distance from the vertex.

27. The method of claim 1, wherein the mapping is created for a point on a polygon surface not coinciding with any polygon vertex.

28. A method comprising:
displaying, using a computer system, an initial mapping from a first configuration of a source shape to a first configuration of a target shape, wherein the initial mapping is created using a training set of previous associations of other configurations of the source shape with other configurations of the target shape, respectively, created by user selection of source positions of the other configurations of the source shape for association with target positions of the other configurations of the target shape; and
iteratively (i) receiving, using the computer system, feedback generated by a user sculpting the first configuration of the target shape into a second configuration and (ii) adjusting the initial mapping based on the feedback.

29. A computer-implemented method for mapping a source shape to a target shape, the method comprising:
associating, using a computer system, a user-selected first configuration of a source shape with a user-selected first configuration of a target shape;

associating, using the computer system, a user-selected second configuration of the source shape with a user-selected second configuration of the target shape, the configurations being at least partially defined by a mesh comprising vertices; and generating, using the computer system, based on the associations, a mapping between a third configuration of the source shape and a third configuration of the target shape, wherein the mapping comprises an affine transformation based on a transform of selected vertices of the source shape, the transform being relative to local vertices within a predetermined distance from the selected vertices.

30. The method of claim 29, wherein the affine transformation is derived from the associations between the source and target shapes for the first and second configurations.

31. The method of claim 30, wherein the derivation comprises interpolating or extrapolating the affine transformation using the associations.

32. The method of claim 29, wherein the transform of the selected vertices is at least partially expressed as a change in location of the selected vertices relative to a location of the selected vertices in the first configuration.

33. The method of claim 29, wherein the mapping between the third configuration of the source shape and the third configuration of the target shape is based on user input.

34. The method of claim 33, wherein the user input comprises values that modify a weighting factor that indicates a contribution of at least one of the associations on which the mapping is based.

35. The method of claim 33, wherein the user input comprises additional associations between corresponding positions of the source and target shapes.

36. The method of claim 29, further comprising generating a mesh of the source shape based on motion capture data associated with an actor.

37. The method of claim 29, further comprising generating a mesh of the target shape based on a computer-generated character.

38. The method of claim 29, further comprising displaying to a user the mapping between the third configuration of the source shape and the third configuration of the target shape.

39. The method of claim 29, wherein the third configuration is added to a training set used to generate additional mappings between the source and target shapes.

40. The method of claim 39, wherein the training set comprises the associations of the first and second configurations of the source shape with the corresponding first and second configurations of the target shape.

41. A method of generating animation, the method comprising:

generating, using a computer system, a mapping between a first configuration of a source mesh and a first configuration of a target mesh based on previous mappings, wherein the previous mappings were created by a user selecting source positions of other configurations of the source mesh for association with target positions of other configurations of the target mesh;

wherein generating the mapping comprises applying an affine transformation to transforms of one or more vertices of the source mesh, and wherein the transforms are defined relative to vertices a predetermined distance from the one or more vertices;

receiving input in the computer system generated by a user sculpting the first configuration of the target mesh into a second configuration; and generating, using the computer system and based on the input, a refined mapping between the first configuration of the source mesh and the second configuration of the target mesh.

42. A system comprising:

a mapping function generator for generating mappings between a plurality of configurations of a source shape and a plurality of configurations of a target shape, respectively, wherein the mappings are based on a training set of previous associations between the source and target shapes created by a user selecting source positions of other configurations of the source shape for association with target positions of other configurations of the target shape; and an interface for receiving modifications, based on user input received in response to an output of a first configuration of the target shape generated from a first configuration of the source shape by at least one of the mappings, the user input sculpting the first configuration of the target shape into a second configuration of the target shape, and modifying the training set for generating at least one refined mapping from the first configuration of the source shape to the second configuration of the target shape.

* * * * *

UNITED STATES PATENT AND TRADEMARK OFFICE
CERTIFICATE OF CORRECTION

| | | |
|---|---|---|
| PATENT NO. | : 8,035,643 B2 | Page 1 of 1 |
| APPLICATION NO. | : 11/688066 | |
| DATED | : October 11, 2011 | |
| INVENTOR(S) | : Frederic P. Pighin, Cary Phillips and Steve Sullivan | |

It is certified that error appears in the above-identified patent and that said Letters Patent is hereby corrected as shown below:

Column 13, line 49 of the printed patent, delete "take" and insert -- taken --.

Signed and Sealed this

Thirteenth Day of December, 2011

David J. Kappos
*Director of the United States Patent and Trademark Office*